Sept. 15, 1959 D. A. WEIR 2,904,778

INTELLIGENCE STORAGE EQUIPMENT

Filed Nov. 9, 1956 2 Sheets-Sheet 1

Inventor
D. A. WEIR
By [signature]
Attorney

Inventor
D. A. WEIR
By Robert Harding Jr.
Attorney

United States Patent Office 2,904,778

Patented Sept. 15, 1959

2,904,778

INTELLIGENCE STORAGE EQUIPMENT

Donald Adams Weir, London, England, assignor to International Standard Electric Corporation, New York, N.Y., a corporation of Delaware Application November 9, 1956, Serial No. 621,361

Claims priority, application Great Britain December 30, 1955

11 Claims. (Cl. 340—174)

The present invention relates to intelligence storage equipment, and especially to equipment for testing such equipment.

According to the present invention there is provided equipment for carrying out a test sequence for a bi-stable storage device comprising the steps:

(*a*) Applying a test signal to a device such as to change it condition in a particular direction;

(*b*) Detecting and registering whether a change of condition occurs;

(*c*) If no change of condition has occurred, applying a further signal to change the condition of said device in the opposite direction;

(*d*) Repeat (*a*);

(*e*) Detect whether a change of condition occurs;

(*f*) Detect whether, in (*b*) and (*e*) "change" and "no change" have been detected; and (*g*) Give a fault indication if step (*f*) detects that (*b*) and (*e*) both detected "change" or both detected "no change."

Examples of intelligence storage equipment to which the present invention is applicable include the ferro-magnetic storage matrix and the ferro-electric storage matrix, although other forms of intelligence storage equipment exist to which the present invention is applicable.

The invention will now be described with reference to the accompanying Figs. 1 and 2, which show an embodiment thereof in which each storage device is a single ferromagnetic element.

A ferro-magnetic element can be formed as a minute tape-wound core, as is the case in the ferro-magnetic storage matrix described and illustrated in a paper entitled "Static Magnetic Memory Matrix and Switching Circuits," by J. A. Rajchman, in the R.C.A. Review for June 1952, at pages 183 to 201. Alternatively each ferromagnetic element can be formed from a small ferrite ring, or from the material surrounding a hole in a ferrite plate or block, or by the material surrounding the control and reading wires in a ferrite plate. Examples of the latter alternatives are described in co-pending application of Ridler and Grimmond, Serial No. 492,982, filed March 8, 1955.

An intelligence storage matrix using magnetic material to which the present invention is applicable comprises a number of separate ferro-magnetic storage elements each of which can be set to either one of two stable states. For convenience these states are herein designated positively and negatively magnetised respectively. One storage element is provided for each element of intelligence to be stored. In the particular storage equipment described herein, the elements are arranged in a co-ordinate array of rows, each of $m$ elements, and of columns, each of $n$ elements, providing $mn$ elements in the array. The invention is, of course, not limited to two co-ordinate arrays.

Each element has three windings, two control windings and a read-out winding. In practice these windings are usually each formed by a single wire traversing the element, in the case of a separate core the wire passing through it, and in the case where each element is the material surrounding a hole in a ferrite plate the wires may be moulded into the plate. The read-out windings of all elements are interconnected by a lead which forms a common output connection; in Fig. 2 of the accompanying drawing the uppermost windings of the elements are the read-out windings. As also shown in Fig. 2 the control windings are co-ordinately interconnected to form two sets of control leads, one set referred to as the "verticals" and one set referred to as the "horizontals."

As has been more fully described in the Rajchman paper mentioned above, to select a given element, the appropriate horizontal lead and vertical lead are energised. For instance, to select core $(m+2)$, vertical lead V and horizontal lead H are selected and each has applied to it a current equal to half that necessary to change the state of the element from one stable state to the other. The direction of the applied currents is such, if reading is in progress, as to set the element to the state wherein it is positively saturated. It will be assumed that 1 or mark is stored by setting an element to its negatively-magnetised state and 0, or space, is stored by setting an element to its positively magnetised state. When an element has been set to store 1, the selection for reading will set it to its positive state so that a large change in the flux threading the read-out winding occurs. Therefore there is produced a relatively large output pulse in the read-out winding. If a positively-magnetised element is read (i.e. 0), the output is either no pulse or a pulse which is considerably smaller than that produced when reading a negatively magnetised element.

When recording, the horizontal and vertical wires appropriate to the element to be set are pulsed with current flowing in the direction necessary to set the element, negatively for 1 or mark and positively for 0 or space. Obviously if the element is already in the desired condition its state is not altered. At this point it is worth mentioning that since reading, as described in the preceding paragraph, destroys the stored intelligence, if that intelligence is to be retained it must be replaced after the reading has been effected.

Pulses for controlling reading, recording and testing are derived from a clock-pulse generator. CPG (Fig. 1) which, with a pulse shaper PF and two delay circuits D1 and D2 produces a set of three sharp staggered pulses $t1$, $t2$, $t3$ per clock pulse from CPG. The input circuit IC for the matrix is arranged, under control of $t2$, to produce $t2$ pulses when 1 or mark is to be recorded.

A matrix of the type referred to can be used as a serial store, when the elements are scanned singly and successively under control of scanning circuits, or it can be used as a part of a parallel access store. In the latter case, each matrix holds one digit of each word to be stored. That is, for a store for 100 words each of 32 digits, there would be 32 matrices each having 100 storage elements, for instance having $n=m=10$.

Where the storage matrix is used as a serial store or as part of a parallel-access store it is desirable to be able to test the serviceability of the respective storage elements and of the associated reading and recording circuits. This is effected by testing the elements singly in a repetitive cycle wherein all elements are tested. Clearly this must be effected without preventing normal reading and recording. This is achieved by scanning the elements singly and successively in such a way that the scanning circuits "dwell" on each element for a period defined by three clock pulses, i.e. for three sets of $t1$, $t2$ and $t3$. During the first set of $t$ pulses, the normal reading from or recording into the storage matrix can be effected. In a parallel access store any element can be read from or recorded in at this time, while if the store is a serial store it can only be done to the element being scanned.

During the second set of *t* pulses, the condition of the element being scanned is read for test purposes. If the element was 1 when the reading occurred, the reading sets it to 0, while if it was at 0 when read, the associated circuits serve to set it automatically to 1. During the third set of *t* pulses the operations caused during the second set of *t* pulses are repeated. Thus the final state of the element is the same as it was immediately after the first set of *t* pulses. A registration is made as to whether or not there was an output obtained from the store during the second *t* pulse set and this is compared with the result of the third *t* pulse set. If the results of the operations on the second and third *t* pulse sets differ, it is assumed that the element and its associated reading and recording circuits are serviceable. If the outputs are the same, an alarm is given, and the scanning circuits can be stopped on their setting for the element at which the fault was detected.

*Detailed description*

Figure 1:
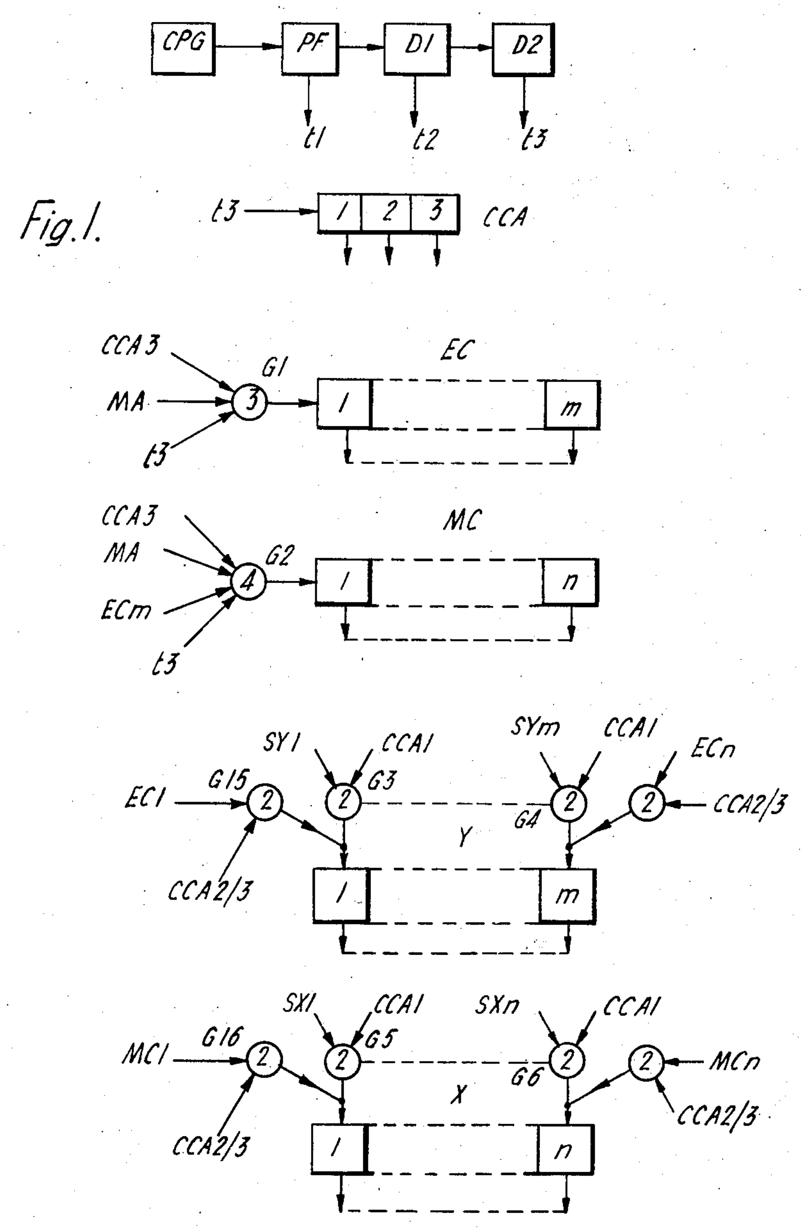
Figure 2:
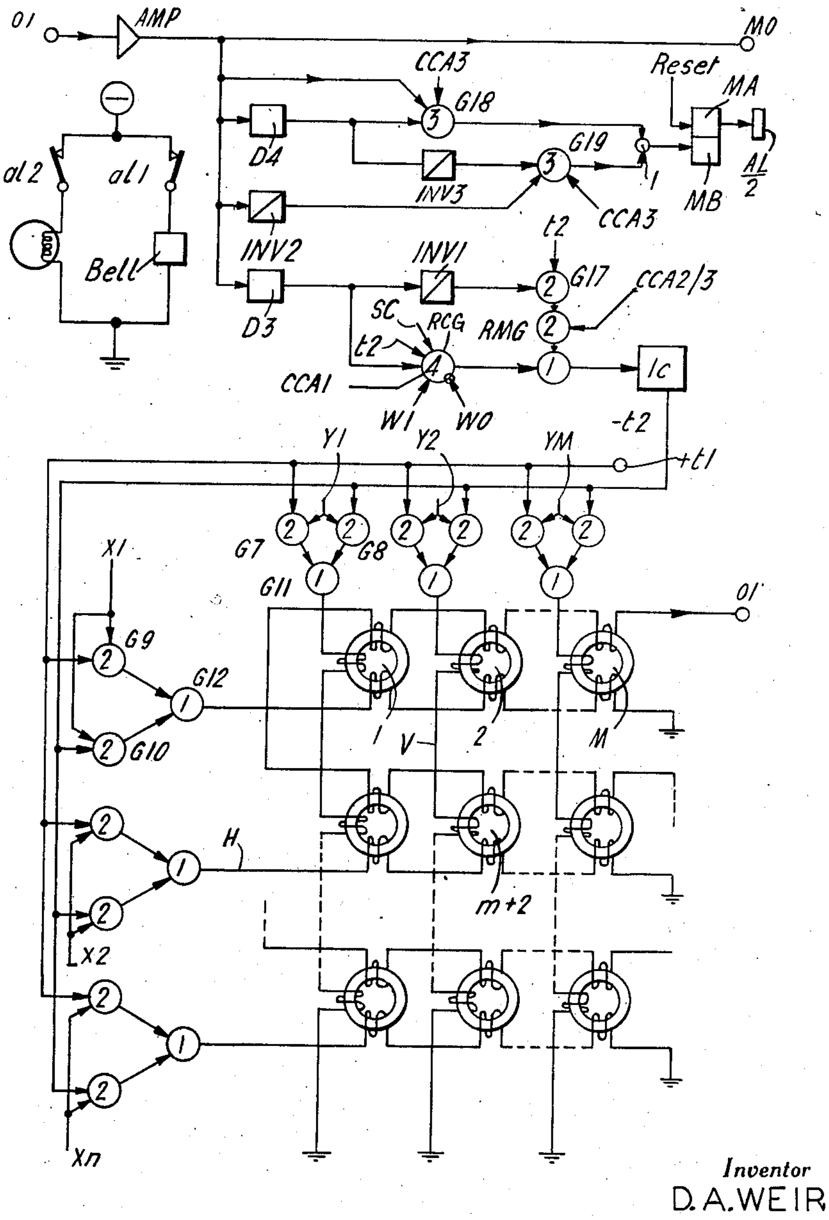

The triple dwell on each storage element is obtained by a scale-of-three distributor CCA which is driven by *t*3 pulses. This distributor may be any well known form of counter which is stepped along by a train of input pulses and each unit of which delivers an output potential when it is operated. The output from CCA3, the last unit of CCA, is used to drive a pair of distributors EC and MC (Fig. 1) which control the scanning and which may be counters of similar design to that of CCA.

EC is the "row" distributor, and has a number of units equal to the number of elements per row of the matrix. This distributor, like other distributors CCA and MC has one unit operated at a time, and a pulse applied in common to all units operates the next unit and renders non-operated the previously operated unit. EC is stepped, i.e. the operated condition is moved along, once in response to each output pulse from CCA via a gate G1. This gate has three controlling inputs, *t*3, CCA3 and MA, and gives an output to step EC when all of its controls are simultaneously energised. Gates are represented in the accompanying drawing by circles each having a number of controlling inputs (controls) and a single output, a gate opening to give an output when a number of its inputs equal to the number in its circle are simultaneously energised. As will be described later the control MA is normally energised, and only becomes de-energised to stop the scanning if MB of a bistable circuit MA—MB operates to render MA inoperative on detection of a fault.

The "column" distributor MC has a number of units *n* equal to the number of elements per column of the matrix. It is stepped once via a gate G2 on each coincidence of EC having its unit EC*m* operated, MA being energised, CCA3 being operated, and a *t*3 pulse occurring. The use of *t*3 to control EC and MC ensures that these distributors operate at the end of the appropriate *t* pulse cycles.

The outputs from EC and MC are used to control a pair of multi-stable registers X and Y which control the currents applied to the control windings of the matrix via an assembly of gates. These registers are similar to the distributor in that they have one unit operated at a time, and that when another unit is operated the previously operated unit is rendered non-operative. However, with one unit operated, any other unit can be operated. Thus these registers enable selection of any storage element during the first *t* pulse cycle of each dwell for three cycles.

*Reading the condition of a selected element and/or altering its condition*

As mentioned above, the two multi-stable registers X and Y are provided (Fig. 1), Y being the "row" register, with *m* elements, and X the "column" register, with *n* elements. Each register element has associated with it a pair of gates, one of which is used for optional control—during the first *t* cycle—while the other is used for control from the distributors via the register. The optional control gates all have a control which is energised when CCA has CCA1 energised, and each has another control which is energised by means not shown in accordance with the identity of the element to be selected. For instance, for Y there are shown two gates, G3 and G4 which are associated with Y1 and Y*m* respectively. Corresponding gates are provided for X, G5 and G6 for X1 and X*n* respectively being shown.

To read a selected element, the selection controls of the optional control gates for the appropriate units of Y and X are energised. For instance, to select element No. 1, SY1 of G3 and SX1 of G5 are energised. Then on CCA1, Y1 and X1 are operated irrespective of the state of EC and MC so that controls of G7 to G10 of the control lead gates of the matrix are energised. At *t*1, the second controls of G7 and G9 are energised, so positive current pulses pass in gates G11 and G12 respectively to the vertical and horizontal leads which extend to the control windings of element No. 1. G11 and G12 are mixing gates, i.e. they decouple the respective inputs from each other.

Although the gates controlling the horizontal and vertical lines are current gates, they are shown for convenience as if they were normal voltage gates.

The pulses applied to element No. 1 are large enough together to set that element to its positively magnetised state. Neither of these pulses can alter the state of an element on its own, so only element No. 1 is selected. Hence if this element is already positively magnetised there is little or no output while if it is negatively magnetised a relatively large output pulse is produced. This pulse proceeds via output O1 to an amplifier AMP and therefrom to an output lead MO.

The output pulse produced during the reading is also applied to a delay circuit D3, which delays it to the *t*2 position. This delayed pulse is applied to a control circuit shown as a gate RCG. This includes among its controls a lead SC which is energised by means not shown when an element is to be read and/or have its condition changed. The other controls are *t*2 and CAA1, so that this gate is only effective during the first *t* pulse cycle. RCG and the control via SC are so arranged that when reading occurs, if the condition read is a large pulse (i.e. if 1 is read) a pulse is applied to the input circuit IC to cause the latter to generate a *t*2 pulse.

Y1 and X1 are both operated, so that when *t*2 is produced, currents are caused to flow in the control leads threading element No. 1 via gates G8 and G11, and G10 and G12 respectively. Hence both of the control windings of elements No. 1 are negatively pulsed, and that element, and that element only, is set to its negatively magnetised state. If the condition read is no pulse (i.e. 0) the element having been previously positively magnetised, there are only three effective inputs to RCG so that it gives no output. Then IC does not produce —*t*2 and so the element is left unaltered. Then it will be seen that the result of reading is automatically replaced in the read element when reading without alteration is being effected.

If the recorded state of the element is to be altered, the additional controls of RCG are such that if 1 is to be recorded —*t*2 is produced and if 0 is to be recorded, no —*t*2 is generated, irrespective of what was read. Thus, if 1 is to be recorded, at *t*2 and CCA1 with SC energised, W1 will be energised by means, not shown, so that RCG will deliver an output to IC irrespective of what is applied to RCG from D3. The other control of RCG is WO and where it meets the circle of RCG there is a small ring. This means that if WO is energised, RCG cannot give an output no matter what the conditions of the other inputs. Then with WO energised there is no input to IC, and 0 is recorded. This would also be energised for reading without restoring, i.e. for erasure.

*Monitoring operations*

It will be remembered that EC and MC are stepped continuously through their cycles under control of the *t*3 CCA3 combination, so that the storage elements are singly and successively selected under control of EC and MC.

In addition to the optional control gates whose use has been described, each unit of each multi-stable register has associated therewith a gate controlled by the corresponding unit of EC or MC and by a control lead CCA2/3. The latter control is energised when either CCA2 or CCA3 are operated.

As a convenient point to start describing, it will be assumed that $EC_m$, $MC_n$, $Y_m$, $X_n$ and CCA3 are operated and *t*3 pulse is imminent. This *t*3 pulse steps CCA to CCA1, EC to EC1 via G1, and MC to MC1 via G2. While CCA1 is operated any optional recording and/or reading can occur in the manner already described.

The next *t*3 pulse steps CCA to CCA2, so that gates G15 and G16 associated with Y1 and X1 respectively each have both controls energised so Y1 and X1 are both operated. On the next *t*1 pulse i.e. *t*1 of the second *t* pulse cycle, the matrix-controlling gates G7, G11 and G9, G12 are opened so that the state of element No. 1 is read. It will be assumed that this element is negatively magnetised, i.e. it is storing 1. The +*t*1 inputs tend to set the selected element to its positive state, so a large output pulse occurs on the output winding and this reaches AMP via O1.

The output from AMP is applied via the delay circuit D3 to an inverter INV1, the output of which is applied via a gate G17, whose other control is *t*2, to a controlling gate RMG. Since the output from D3 has been inverted by INV1, neither G17 nor RMG can give an output, so 1C is unaffected. This means that the selected element (No. 1) is left positively-magnetised. Thus it has been read and its condition reversed.

The output pulse from AMP is also applied to a delay circuit D4 whose delay is equal to a full *t* pulse cycle and which therefore applies a pulse coincident with the output from AMP to G18 when the next *t*1 pulse is present. Thus this pulse is effectively registered until the time at which the next *t*1 pulse occurs. The output from AMP to RCG has no effect because neither CCA1, SC, W1 nor WO can be energised in this condition. A further precaution against any interference via RCG would be to give to RCG an inhibiting input which disables it at CCA2 and CCA3. RMG could correspondingly have an inhibiting input to disable it at CCA1.

On the next *t*3 pulse, CCA steps to CCA3, which maintains the joint CCA2/3 control effective, so that Y and X are not altered. Therefore element No. 1 is again selected, and the reading currents which drive it positive are again applied, but since the element is positively magnetised already, there is little or no output pulse from O1. The output from AMP to RCG is again ineffective. However, the output from AMP is applied to a gate G18, which it reaches at the same time as the output from AMP during CCA2, this being applied thereto via D4. The third control of G18 is CCA3, to ensure that it can only have any effect at this time. If the operations have all been correct, these two outputs read from element No. 1 differ, so G18 gives no output. Hence MB is not operated. However, G18 is so arranged that if the AMP outputs are the same, either both no pulse or both pulse, G18 operate HB, which causes relay A1, controlled by MA, to release and at its contacts *al*1 and *al*2 to operate an alarm bell and lamp. The fact that MA is non-operated when a fault has been detected disables G1 and G2, so stopping EC and MC, which indicates which element of the matrix is faulty.

The output from AMP is again applied via D3 and INV1, the latter being arranged to give an effective output in the absence of a large pulse, such as is obtained when 1 is read and no output when such a pulse occurs at its input. Hence during CCA3, INV1 energises a control of G17, which delivers an output to RMG at *t*2. The latter, since CCA3 is energised gives an output to IC, which therefore produces —*t*2 to set element No. 1 negative. Thus the second reversal of the element whose condition is being tested has been effected leaving the element in the condition it was in when that testing commenced. The re-writing could be inhibited under control of MB if this was to be desirable.

The next *t*3 pulse, assuming that no fault has been detected, steps CCA to CCA1, EC to EC2 and MC to MC2. At CCA2, Y2 and X1 are operated via their controlling gates, so when *t*1 of CCA2 occurs, element No. 2 is read. This is assumed to be positively magnetised, i.e. set at 0. Hence there is little or no output, and the A output of AMP via INV1 produces a positive pulse, and then causes IC to produce —*t*2. Hence the element is set at 1, i.e. negatively magnetised. The output via D4, with its delay to the next *t*1, is applied via a second inverter INV2 to a gate G19, so that when 0 is read at *t*1 of CCA2, a pulse reaches G19 at *t*1 of CCA3. Thus the result of the first reading operation is again registered.

When CCA3 occurs, the element No. 2 is again read, and this time a large output pulse is produced, which via D3 and INV1 does not allow any —*t*2 to be produced leaving the core positively magnetised. Thus once again two reversals of the core being read have been produced. The large pulse output from AMP also reaches G19 via a further inverter INV3, which converts it to "no pulse," and again if this and the output from AMP delayed by D4 are different, G19 gives no output. Again, of course, if the two AMP outputs are the same MB is operated and the alarm given. Thus once again the selected element has been reversed twice and two consecutive readings compared. G19, like G18 can only operated at CCA3.

The next *t*3 steps CCA to CCA1 and advances EC and MC, and the operations continue in the same manner.

It will be notice that when MB of the test bistable circuit operates, the fact that MA is rendered non-operative not only gives the alarm, but disables G1 and G2 as already mentioned. Therefore the distributors are stopped in their settings characterising the element of the storage matrix which is faulty. Thus an indication of the identity of the element at which the fault was detected can be obtained from the settings of the distributors when an alarm has been given. It will be noted also that the controlling gates of the matrix have been represented for simplicity as if they were voltage gates. However, as has been described, the matrix is current-controlled, the necessary currents being produced, for example by hard valves controlled by the gates shown. Similarly the comparator G18 and the control circuits RMG and RCG are, in the interests of simplifications, shown as voltage gates.

The monitoring technique used in the circuit shown is, of course, applicable to other stores, such as the ferro-electric matrix store. The controlling circuits for such a store are, in fact, almost identical to those shown, the only difference being that the values of the operating currents are different.

What is claimed is:

1. Equipment for carrying out a test sequence for a bi-stable device comprising control means, means connected between said control means and said device and operated by said control means for applying a predetermined test signal to said device such as to change it to its second condition if it is in its first condition, means connected to said device for detecting a value representing a change of condition or no change of condition of said device, means responsive to said detecting means and connected thereto for registering a value representing change or no change of condition of said device, means under control of said control means and connected thereto and to said device and responsive to said registering means registering a value representing no change of condition of said device for applying a further signal to said device such as to change it from its second condition to its first condition, said control means thereafter operating said test-signal-applying means for again applying said test signal to said device, means connected to said detecting means and to said registering means for comparing the value representing the condition of said device as registered in said registering means and the value representing the condition of said device as detected by said detecting means after said last mentioned operation of said test signal means, and means operated by said comparing means and connected thereto for indicating a fault when the values so compared are the same.

2. Equipment, as claimed in claim 1, and in which said registering means comprises an electrical delay circuit having a delay equal to the period between operations of the test-signal-applying means by the control means, whereby the results of the first and second detections become simultaneously available.

3. Equipment, as claimed in claim 1, further comprising a plurality of storage devices, and means connected to the control means and to said devices for performing the test sequence successively on said plurality of storage devices, the means for applying the test signal to a storage device being similar to a reading device for that storage device, and the means for applying the further signal being similar to a recording device for that storage device.

4. Equipment, as claimed in claim 3, in which the control means comprises an electrical distribution circuit which allows alternate time periods for normal reading and/or recording and for testing.

5. Equipment, as claimed in claim 4, in which said distribution circuit comprises a first timing circuit including means for assuming conditions individual to said storage devices singly and successively, means connecting said indicating means with said distribution circuit for stopping said distribution circuit in response to a fault indication by said indicating means, so as to indicate the storage device being tested when a fault was detected, and a second timing circuit connected to said first timing circuit for providing the alternate time periods during which said first timing circuit is in each one of its conditions, whereby the storage devices are continuously tested throughout the operation of the equipment.

6. Equipment, as claimed in claim 5, further comprising an access control circuit separate from the timing circuits and connected to the means for assuming conditions individual to said storage devices and selective means connecting said access control circuit with the second timing circuit for causing said access control circuit to obtain access to any one of the storage devices during any one of the time periods allotted to normal reading and/or recording by the second timing circuit.

7. Equipment, as claimed in claim 6, in which the storage devices are arranged in a co-ordinate assembly, access to a device being obtained via the row and the column to which that device belongs, and in which the first timing circuit comprises a first distributor having a position individual to each row of the array and means connected to the second timing circuit for stepping said first distributor once on each cycle of the second timing circuit, and a second distributor having a position individual to each column of the array and means connected to the second timing circuit for stepping said second distributor once on each cycle of said first distributor, whereby each combination of a position of said first distributor and a position of said second distributor defines one of said storage devices.

8. Equipment, as claimed in claim 7, and in which each said storage device is a ferro-magnetic storage element.

9. Equipment, as claimed in claim 7, and in which each said storage device is a ferro-electric storage element.

10. Equipment, as claimed in claim 1, in which the storage device is a ferro-magnetic storage element.

11. Equipment, as claimed in claim 1, in which the storage device is a ferro-electric storage element.

References Cited in the file of this patent

UNITED STATES PATENTS

| | | |
|---|---|---|
| 2,719,962 | Karnaugh | Oct. 4, 1955 |
| 2,719,965 | Person | Oct. 4, 1955 |
| 2,784,391 | Rajchman et al. | Mar. 5, 1957 |
| 2,793,344 | Reynolds | May 21, 1957 |